Jan. 29, 1957     D. SILVERMAN     2,779,428
SEISMIC SURVEYING

Filed July 14, 1951     5 Sheets-Sheet 1

INVENTOR:
DANIEL SILVERMAN
BY Newell Pottaf
ATTORNEY

INVENTOR:
DANIEL SILVERMAN
BY Newell Pottoff
ATTORNEY

Jan. 29, 1957  D. SILVERMAN  2,779,428
SEISMIC SURVEYING

Filed July 14, 1951  5 Sheets-Sheet 3

*INVENTOR:*
DANIEL SILVERMAN
BY Newell Pottorf
*ATTORNEY*

INVENTOR:
DANIEL SILVERMAN
BY Newell Pottof
ATTORNEY

Jan. 29, 1957　　　D. SILVERMAN　　　2,779,428
SEISMIC SURVEYING

Filed July 14, 1951　　　　　　　　5 Sheets-Sheet 5

*INVENTOR:*
DANIEL SILVERMAN
BY Newell Pottoff
*ATTORNEY*

United States Patent Office 2,779,428
Patented Jan. 29, 1957

2,779,428

SEISMIC SURVEYING

Daniel Silverman, Tulsa, Okla., assignor to Stanolind Oil and Gas Company, Tulsa, Okla., a corporation of Delaware Application July 14, 1951, Serial No. 236,730

15 Claims. (Cl. 181—.5)

This invention relates to seismic geophysical surveying and is directed particularly to a method and apparatus for improving the signal-to-noise ratio of the surveying system. As the term "noise" is used in this specification, it may include not only noise of a generally random character, but also seismic signals which occur so close together in time that they are difficult to separate or resolve, or seismic signals reaching the detectors by unknown paths or from unwanted directions.

In seismic geophysical surveying, the primary objective is to create and receive recognizable signals in the form of reflected or refracted seismic energy traveling from a source to a receiver along determinable paths. The usual basis for interpreting arrivals of seismic energy as the desired events is the amplitude, frequency content, and simultaneous arrival of similar waves at spaced reception points.

If the signal-to-noise ratio is favorable, that is, if the amplitude of the desired signals is at least equal to or is greater than the amplitude of the interfering waves, the problem of identifying the desired events is not serious regardless of the method of compounding or recording the received waves. If, on the other hand, the signal-to-noise ratio is poor or unfavorable, then it becomes a primary problem to ascertain if any of the desired signal at all is present in the energy received.

There are many areas of interest in petroleum prospecting where the signal-to-noise ratio may be characterized as poor, and there are many other areas where the acoustical reflections received from the depths that are of primary interest are weak when they exist at all. Accordingly, a basic requirement in improving and extending the utility of seismic geophysical surveying is the improvement of the seismic signal-to-noise ratio.

Stated in another way, the primary object of my invention is to provide a seismic prospecting method and apparatus which is capable of improving the signal-to-noise ratio of received seismic waves, particularly in areas of geologic interest but where the signal-to-noise ratio is poor. Other and more specific objects may be briefly enumerated as: to provide an additional criterion on the presence of signals without correspondingly increasing noise; to provide a system of electromechanically discriminating against noise and in favor of signals; to provide a discrimination system for desired seismic energy which, besides the usual functions of amplitude, frequency, and phase relation of multiple signals, is based additionally on a time function; to provide a way of surveying in the presence of beds of high reflection coefficient causing reverberations; to create and utilize a seismic signal having a parameter which cannot be affected or varied by the subsurface strata, and effectively employing said parameter as part of the means of finding the desired signal in the received wave trains; to impress upon the received signal a character which is in part predictable regardless of the attenuation or dispersion characteristics encountered in the travel path, provided only that the signal be of an amplitude to be detectable; to include in the origin of the signals a time spacing pattern which remains invariant with wave travel time and with the effects of the media of transmission.

The foregoing and other objects are accomplished by a method and apparatus for seismic geophysical surveying which generates the seismic waves by applying to the earth a plurality of impulses in a known and arbitrary time sequence such that the reflections from subsurface interfaces or other waves that it is desired to observe must occur in the same time sequence. While multiple charges and impulses have been used previously in seismic surveying, they have generally been fired so as either to create a single effective impulse or to create certain reflection frequencies that it is desired to emphasize. In my invention, however, the separate impulses remain completely separated and distinct in time and do not noticeably overlap. Thus from two to five explosive charges are detonated successively at arbitrarily selected intervals of time. The spacing in time between successive charges is preferably not so great that the weaker reflections from deeper beds will be often masked by subsequent reflections from upper beds, but there is preferably at least one period of the predominant reflection wave length, and typically from 50 to 200 milliseconds, between successive charges.

After receiving and recording the resultant waves, the records are analyzed either visually or preferably with mechanical and electronic means for events which have not only the amplitude, frequency, and phase distribution of conventional seismic waves on multiple traces, but also the imposed spacing in time in addition thereto. While this analysis can sometimes be done visually, it is preferred to subject the record to an automatic or electromechanical type of analysis designed to apply very accurately as criteria not only the amplitude, frequency, and multiple-trace phase phenomena of the prior art, but also the time-interval criterion of the invention as the indication of occurrence of desired seismic energy.

As it is frequently a characteristic of shot-generated noise that it repeats for successive shots similarly placed in a given location, it is therefore preferred to fire the individual shots in somewhat different but not too widely spaced locations, either in shot holes, or in the air or at the ground surface, so that the unwanted noise due to the respective shots will be as different as possible in arriving at the seismic detectors. Preferably, also, the shots are so located in space that the reflection travel times are either closely similar or differ by known intervals of time which can be allowed for in the subsequent analysis. In recording, the received waves are preferably unfiltered except as may be necessary to remove any large and known regular noise such as alternating-current power-line interference, ground roll waves, wind noise and the like, or noise definitely outside of the frequency energy band of the reflections.

The resulting recorded traces are then subjected to an automatic process of analysis or discrimination which involves determining the cross-correlation functions of the received and recorded traces with an artificial or pattern trace having the form of an expected noise-free series of signal impulses, which would be received from a single reflecting interface. Each recorded trace, which may represent one or more input signals, is multiplied by the pattern trace, and all of the instantaneous values of the products are integrated or summed up over a period of time at least equal to and preferably somewhat greater than the time interval of application of the wave-initiating impulses. The value of this integral or summation is then recorded as one point of the correlation function curve. The complete correlation curve is obtained by repeating the multiplication, integration, and integral-value recording steps while slowly shifting the reflection-pattern trace relative to the received-wave trace or traces, either continuously or by very small steps, from end to end of the received-wave traces. This insures that, at some one time during the shifting process, the pattern trace will be in phase with each multiple-pulse reflection present in the received-wave traces, which time is designated by a peak of the correlation curve.

A special case of the use of repetitive impulses to create a similar repetition pattern in the received signals is in the prospecting of areas having a thick, homogeneous layer possessing strongly reflecting boundaries. In the surveying of areas having such a layer, particularly when it is located adjacent the earth's surface, as is true of the Edwards Plateau region of Texas, it is observed that reverberations are set up between the top and bottom of the layer such that the received pulse at a detector has no longer the characteristics of a single wavelet but consists of a train of waves which have generally the frequency of the reverberations. Accordingly, the determining of travel times to deeper beds than the reverberating layer becomes a problem of establishing the onset time of the reverberation wave trains.

In one embodiment of my invention, advantage is taken of this property of reverberation to produce stronger signals without correspondingly increasing the noise. Accordingly, the timing of the multiple impulses used for creating the seismic waves is preferably such that the direct wave transmission from any subsequent pulse is exactly in phase with a reverberation wave from a previous pulse. The record of the resultant wave trains is then examined to ascertain the presence of the reverberation wave trains and thereby establish the time of onset of each such train. This is done either by relatively sharply filtering the received waves at the frequency of the reverberation wave or preferably by cross-correlating the received waves with an artificial wave train of the reverberation frequency. By slowly shifting the artificial wave train or pulse group in time relative to the received-wave traces, many peaks are obtained in the correlation function, the highest of which can be interpreted in terms of the start of each reflection wave train.

As it is sometimes difficult to know or predict the exact form of idealized reflection waves or wave trains, the present invention also comprises a method for obtaining a relatively noise-free signal trace for use in the cross-correlation with the received waves which include noise. This takes advantage of the fact that the noise generated by the shot is usually of a maximum amplitude near the shot point and decreases with distance therefrom more rapidly than do the amplitudes of the desired signals. Accordingly, a record is taken with the seismometer spread offset at a considerable distance from the shot point to obtain the wave forms of the various reflections that it is desired to observe in the area. Due to the uncertainty of the exact travel paths of the energy arriving at the receivers which are set at a large distance from the shot point, such reflection indications are generally not acceptable for making accurate determinations of interface depths. However, by using the various reflections for cross-correlation with events of about the same time on records made close to the shot point, which also include shot-point generated noise, the effect of this noise is considerably reduced so that the reflections present can be made to stand out and be accurately determined. The method thus permits a substantial improvement of the signal-to-noise ratio of this close-in record from which the depth in question can be accurately determined.

The foregoing will be better understood by reference to the accompanying drawings forming a part of this application, in the various figures of which drawings the same reference numerals are applied to the same or corresponding parts. In these drawings.

Figure 1:
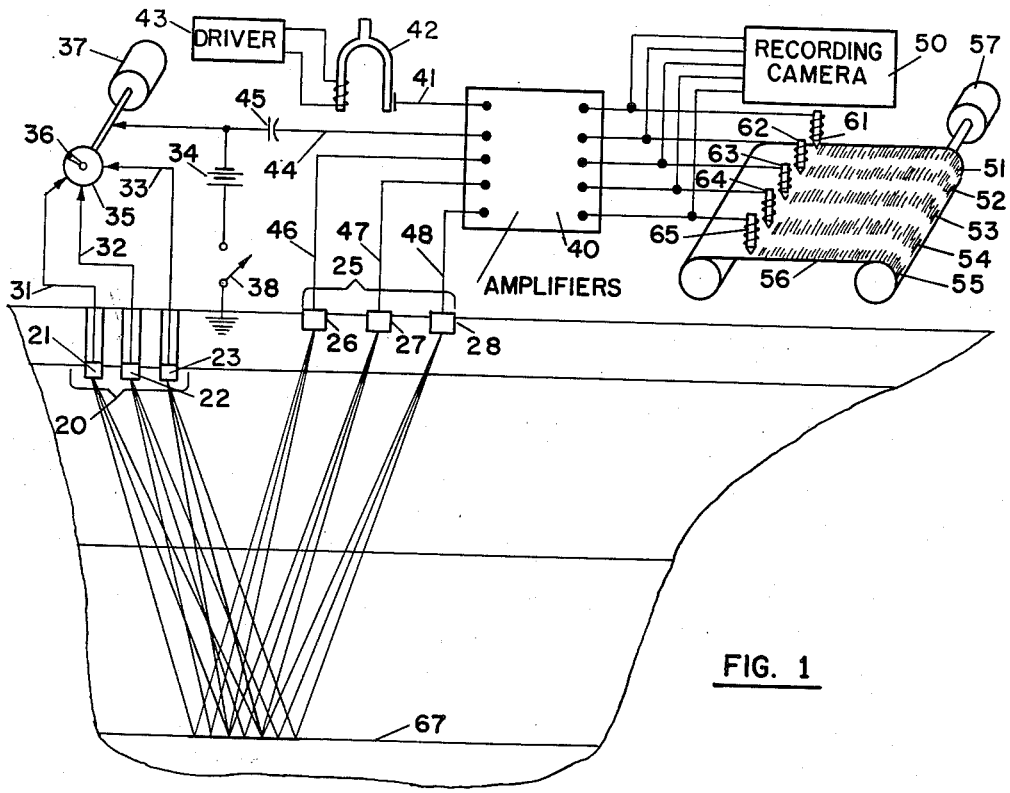
Figure 1 is a cross section of the earth showing an embodiment of the invention in position for making a record.
Figure 2:
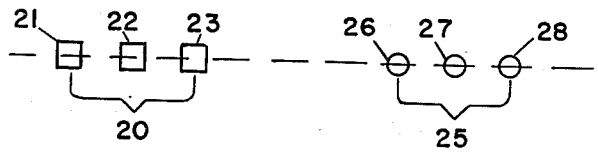
Figures 2 and 3 are, respectively, plan views of alternate arrangements of the shots and detectors.
Figure 3:
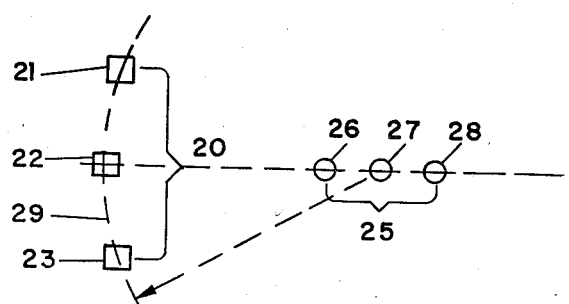

Referring now to these drawings in detail and particularly to Figures 1, 2, and 3, at a shot-point location 20 are located a plurality (from 2 to 5) of explosive charges, for example, the three charges 21, 22, and 23. Spaced from the shot point 20 is a spread 25 of a plurality of seismometers, for example, the three seismometers 26, 27, and 28.

As is shown in the plan view of Figure 2, the charges 21, 22, and 23 can be aligned with the detector spread 25, in which case it may be preferred, but is not essential, to offset the respective charges 21, 22, and 23 somewhat in depth in order to compensate approximately for the differences in travel time which would otherwise exist from any two given charge locations to one of the detectors. The charges 21, 22, and 23 can alternatively be arranged as shown in Figure 3 along the arc 29 of a circle having its center within the spread 25 so that the charges are approximately equidistantly spaced from the detectors and can therefore be at the same depth or height. It will be understood further that the individual charges 21, 22, and 23 can likewise comprise separated charges on the surface of the earth, or in shallow holes, or charge patterns suspended in the air above the ground surface in a manner well known in the art.

In accordance with my invention, the charges 21, 22, and 23 are fired in an arbitrary time sequence, for example, by connecting the respective firing leads 31, 32, and 33 to a battery 34 through a commutator 35 having a contacting or conducting segment 36 rotated at substantially constant speed by an electric motor 37. A switch 38 in series with the battery, when closed by an operator, applies the firing current from the battery 34 to the leads 31, 32, and 33 in sequence as they are contacted by the segment 36 to detonate the respective charges 21, 22, and 23.

The field recording system may include a conventional multiple-channel amplifier 40 to which are connected the various input circuits, one, for example, comprising a timing-signal circuit connected by a lead 41 extending from a tuning fork 42 driven by a driving circuit 43. The time breaks which indicate the instants of explosion of the charges 21, 22, and 23 are fed to amplifier 40 over a lead 44 connected through a condenser 45 to the circuit of battery 34. Signals from the seismometers 26, 27, and 28 are applied to separate channels of the amplifier 40 by the respective leads 46, 47, and 48.

The outputs of the amplifier 40 may, if desired, be applied to a conventional oscillographic camera 50 for making a multiple-trace seismic record in the usual form, but it is preferred in the practice of my invention to make phonographically reproducible records in the form of parallel traces 51, 52, 53, 54, and 55 on a magnetizable tape 56, for example, which is moved at a substantially constant speed by an electric motor 57 past a plurality of magnetic recording heads 61, 62, 63, 64, and 65, respectively connected to the outputs of the various amplifier channels.

By making the time intervals between the detonation of each of the multiple charges 21, 22, and 23 at least equal to and preferably somewhat greater than the period of the predominant seismic-reflection waves, for example, between 50 and 200 milliseconds, it will be apparent that the reflection received by seismometer spread 25 from a subterranean interface such as interface 67 will comprise, not just a single pulse or wavelet, but rather three such pulses separated by the same spacing in time as the spacing of the charge detonations. Consequently, the visual record produced by the recorder 50 may be examined not only for the occurrence of events having the amplitude, frequency, and multiple-trace phase characteristics of the usual seismic reflections, but also for the arbitrary spacing in time imposed on the charge detonations, which can thus be considered as a further criterion in deciding whether a given apparent event is a true seismic reflection or merely extraneous energy.

By the term "period of the predominant seismic-reflection waves" it is meant to designate a minimum time interval of charge detonation separation of the order of 17 to 25 milliseconds. This corresponds to a range of apparent frequencies from about 40 to about 60 cycles per second, which includes a large portion of the seismic reflection energy that it is desired to observe. If it is desired to observe a particular reflection of apparent frequency lower than 40 cycles, however, then the minimum separation time between successive charges should be correspondingly greater than 25 milliseconds, which is the period of a 40-cycle wave.

In other words, once the lowest frequency of interest is selected, then the corresponding minimum value of the time interval between detonations is established. As stated above, the preferable time interval will be somewhat greater than this. Using the 40 to 60 cycle frequency range and the 50 to 200 millisecond detonation time interval as typical, 40 cycles is the lowest frequency of interest and 25 milliseconds is its period. The preferred detonation interval of 50 to 200 milliseconds is thus from 2 to 8 times as great as the wave period.

Figure 4:
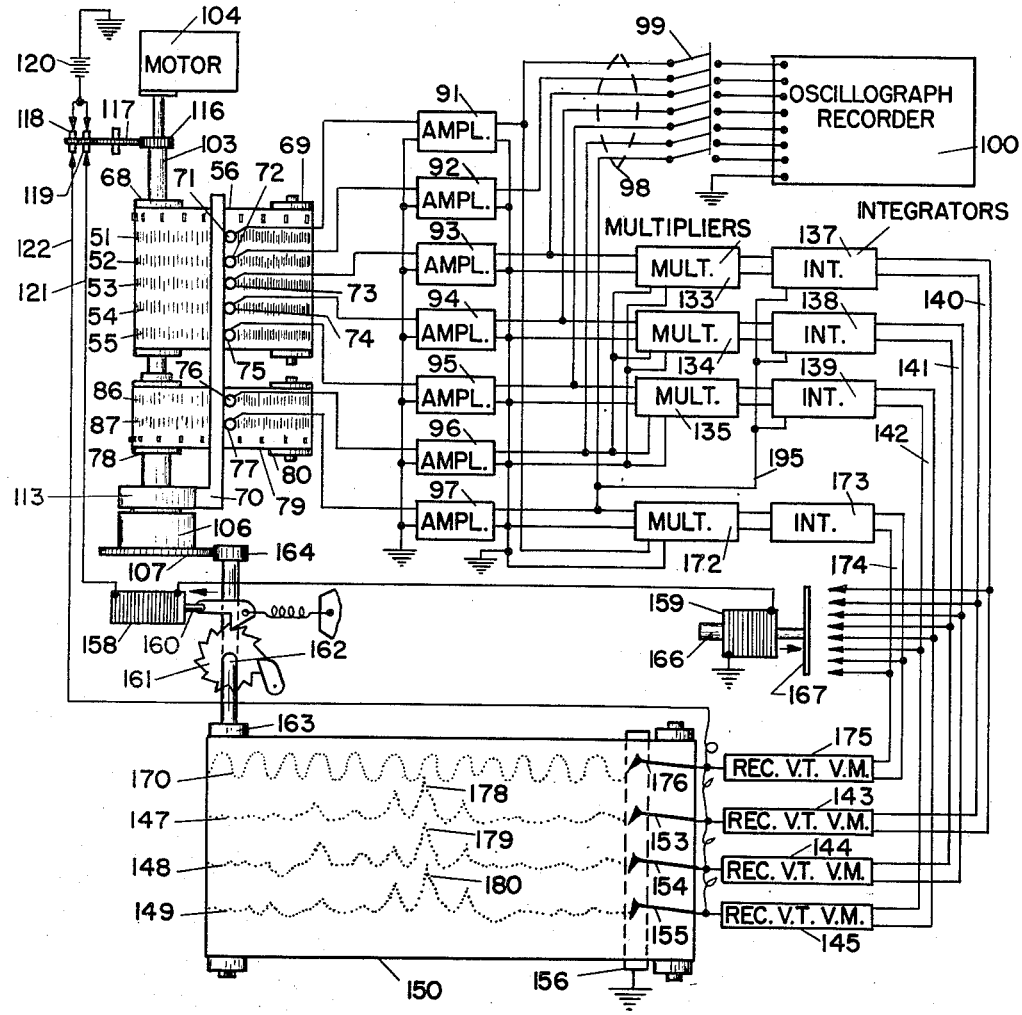
Figure 4 is a view partially diagrammatic of a scanning device embodying the invention.

Instead of visual inspection it is preferred, however, to subject the reproducible record 56 to a type of automatic scanning and reproduction by a system such as is shown in Figure 4. Referring now to this figure in detail, the record 56 is formed into a continuous loop or belt and passed around a driving roller 68 and an idling roller 69. Extending across the tape 56 transversely to its direction of motion is a cross member 70 on which are mounted a plurality of magnetic pickup heads 71, 72, 73, 74, and 75, respectively in positions to be energized by the traces 51, 52, 53, 54, and 55. Also mounted on the member 70 are at least two additional recording or pickup heads 76 and 77 which respectively cooperate with magnetic traces 86 and 87 on a separate reproducible record 79, also in the form of a belt or loop passing around a driving roller 78 and an idling roller 80.

By appropriate electrical leads, the respective pickup heads 71–77, inclusive, are connected to separate amplifiers 91–97, inclusive, the outputs of which are connected by leads 98 through a multiple-pole switch 99 to a recorder 100 of the oscillographic type by which a conventional visible seismic record can be made from the magnetic traces 51–55, and 86 and 87.

Figure 5:
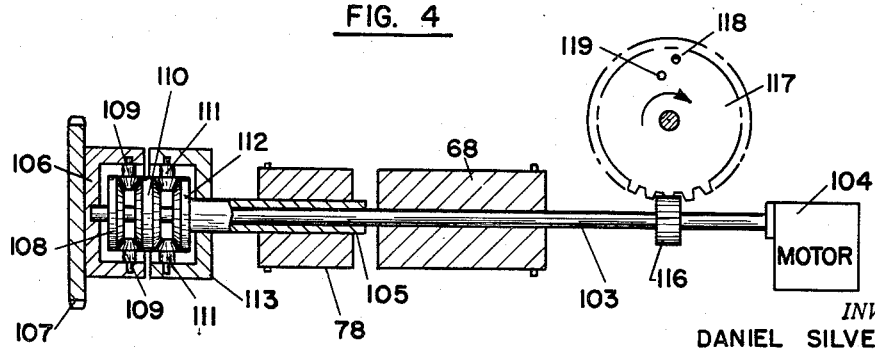
Figure 5 is a view, with some parts in cross section, of the record-handling mechanism of the device of Figure 4.

The means by which the reproducible records 56 and 79 are moved past the various scanning pickup heads will be better understood by reference to Figure 5. Thus, the roller 68 is fixed to a shaft 103 which is rotated at a substantially constant speed by an electric motor 104. Through a transmission unit 106 the roller 78 is driven by a tubular shaft 105 concentric with the shaft 103. In operation, it is customary to drive the two rollers 68 and 78 in synchronism and in the same direction by motor 104. However, it is desired to be able at intervals or continuously to rotate one of the rollers 68 or 78 relative to the other by any desired angle and thus advance one of the records 56 or 79 relative to the other without interrupting the continuous motion of the two belts.

This is accomplished by holding the transmission housing 106 essentially stationary by a gear 107, by which it may be moved when desired, the shaft 103 driving a bevel gear 108, and, through bevel pinions 109 mounted in the housing 106, a bevel idler gear 110 concentric with the shaft 103. This idler gear 110 drives another pair of bevel pinions 111 and through them a bevel gear 112 attached to the shaft 105, the pinions 111 being mounted in a portion 113 of the transmission housing which is at all times stationary and thus not movable by rotation of the gear 107.

With this mechanism it will be observed that if, for example, shaft 103 rotates gear 108 clockwise, a counterclockwise rotation is produced on idler gear 110 of exactly the same speed, as long as housing 106 is stationary. If housing 106 is rotated slightly, however, this creates a relative displacement between the two gears 108 and 110. The function of stationary housing 113 and bevel pinions 111 cooperating with the bevel gear 112 is to reverse the direction of rotation of idler 100 so that bevel gear 112 rotates in the same direction and with the same speed as bevel gear 108. Thus the rollers 78 and 68 rotate exactly together at all times except when the gear 107 is turned.

Mounted also on the shaft 103 is a gear 116 which engages a timing gear 117 preferably formed of an insulating medium such as Bakelite and having, extending therethrough, a pair of metallic contacts 118 and 119. This gear is best shown in Figure 5, but as appears also in Figure 4, once each rotation of gear 117, the contacts 118 and 119 close an electrical circuit between a battery 120 and each of a pair of leads 121 and 122. Preferably, the ratio between gears 116 and 117 is so chosen with reference to the length of the belts 56 and 79 that one complete revolution of the gear 117 occurs for each complete revolution of the belts 56 and 79. As appears best from the side view of gear 117 in Figure 5, when the gear rotates in the direction of the arrow, the contact 118 closes the battery circuit to lead 122 slightly in advance of the closing of the battery circuit to 121 by contact 119.

Figure 6:
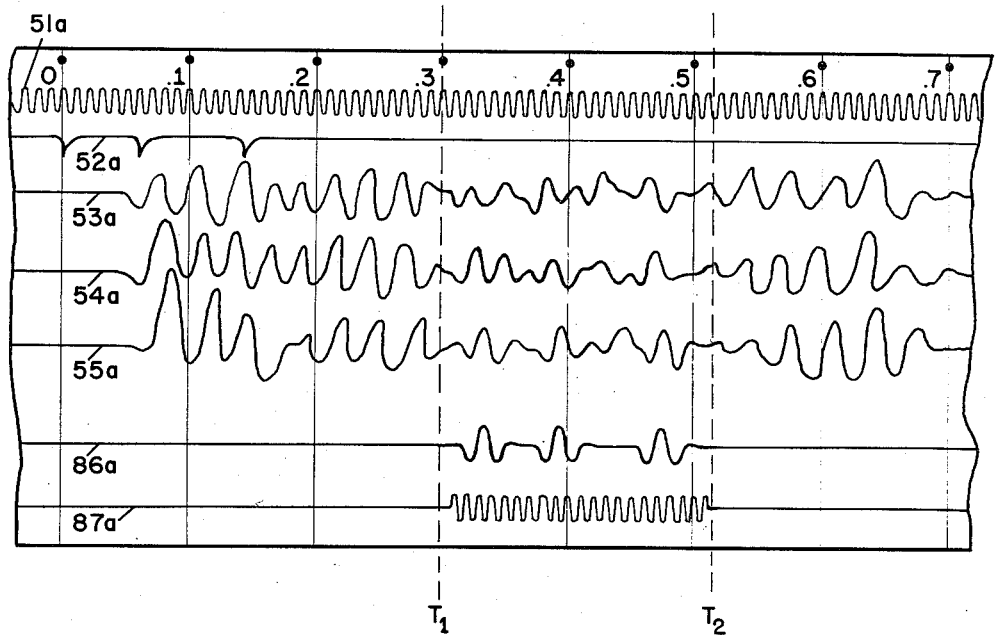
Figure 6 is a view of a record which may be made with the device of Figure 4 when recorded in the conventional manner of a seismogram.

Referring now to Figure 6, therein is shown a portion of a record such as might be made by means of the conventional oscillographic recorder 100 while scanning the reproducible records 56 and 79 during part of one rotation of the belts. The respective traces 51a, 52a, 53a, 54a, and 55a are the same as would be obtained with the recording camera 50. Thus, the trace 51a represents the output signal of the tuning fork 42 serving as a time reference; the trace 52a energized from the channel fed by conductor 44 exhibits the time breaks of the respective explosive charges, while the three traces 53a, 54a, and 55a correspond to the signals received by the respective seismometers 26, 27, and 28.

As previously noted, the occurrence of a reflection in the received energy is indicated not only by the typical appearance of a single reflection wavelet on each of the multiple traces but also by the spacing in time of a succession of such wavelets. Thus, the pattern trace 86a of Figure 6 may be considered to represent the succession of noise-free reflection wavelets that would be expected from the detonation of three charges. The spacing in time of the reflection wavelets corresponds to the spacing in time of the charge detonations, in this example being 60 milliseconds between the first and second charges and 80 milliseconds between the second and third charges.

The trace 87a corresponds to the timing trace 51a and in fact may be made from that trace by transferring a portion thereof to the position of trace 87 on the record 79, by a reproducing process during the time that the two records are running simultaneously. It is not necessary that the oscillation of trace 87a extend throughout the entire record as in the case of trace 51a; and in fact it is preferred that it extend only slightly beyond the duration of the reflection-pulse pattern, as determined by the total interval during which the charge detonations occur.

While, as previously stated, reflections might be determined from a visual inspection of the traces 53a, 54a, and 55a of Figure 6, it is preferred in accordance with my invention to subject these traces in their original form as the magnetized tracks 53, 54, and 55 to analysis by the automatic or electromechanical procedure which will now be described in further detail. Again referring to Figure 4, this analysis comprises multiplying each trace 53, 54, and 55 by the reflection pattern trace 86, integrating the instantaneous values of the three products throughout a time interval at least as long as the reflection pattern, and recording the value of each integral on a chart. To obtain the complete correlation function for each trace with respect to the pattern trace, the foregoing process is repeated cyclically, each time shifting trace 86 slightly relative to the traces 53, 54, and 55. Thus, the output of the amplifier 93, corresponding to the signals received by seismometer 26 and recorded as trace 53, is combined in a multiplying circuit 133 with the output of amplifier 96, corresponding to trace 86, which is the reflection pattern shown as 86a in Figure 6. Similarly, the output of amplifier 94 (from trace 54 and seismometer 27) is applied to a multiplier 134, and the output of amplifier 95 (from trace 55, corresponding to seismometer signal 28) is applied to a multiplier 135, each multiplier being fed also from the amplifier 96. The respective multiplier outputs are applied to integrating circuits 137, 138, and 139 from which the outputs are taken by the respective leads 140, 141, and 142 to recording vacuum-tube voltmeters 143, 144, and 145. These produce visible traces 147, 148, and 149, respectively, on a movable record strip 150 in accordance with the maximum value of the signals received from the respective integrators 137, 138, and 139. Lightly contacting the record 150, which is preferably an electrosensitive paper, are the movable voltmeter contact arms 153, 154, and 155, respectively actuated by the recording voltmeters 143, 144, and 145. The visible marks on the chart 150 are produced by passing electric current from the tip of each of the contact arms to a backing plate 156 behind the sheet 150.

The visible correlation-function traces 147, 148, and 149 are produced as follows: Bearing in mind that the contacts 118 and 119 on the gear 117 close the battery circuit to the leads 121 and 122 once each revolution of the tape belt 56, the tape 56 and the position of gear 117 are so relatively oriented at the beginning of the analysis that the closing of the contacts 118 and 119 occurs at some time between the reception of the last seismic signals and before the first time break on the trace 52. Consequently, the closing of contact 118 applies the voltage of battery 120 to the lead 122 which is connected by a flexible lead to the recorder contact arms 153, 154, and 155, and hence electric current flows through the electrosensitive sheet 150 to the backing plate 156 while the contact 118 remains closed, producing a visible dot at each point of contact with the paper.

The advancing of record 150 is synchronized with the movement of the tape 56 by a circuit including the lead 121 which is connected to two solenoids 158 and 159. The movable core 160 of the solenoid 158 actuates a ratchet gear 161 on a shaft 162 attached to the roller 163 which drives the sensitive record strip 150, it being understood that the teeth of ratchet 161 are normally much closer together than it is practical to show on the drawing. At the same time a spur gear 164 in engagement with the gear 107 on transmission housing 106 rotates the housing slightly thus changing the angular relation between the tape 56 and the tape 79 slightly, advancing one relative to the other to a position which is maintained fixed throughout the remainder of the passage of loop 56 around drive roller 68.

Upon the closing of contact 119 a pulse of current is also applied to the solenoid 159 causing movement of its core 166 to the right bringing contact bar 167 into a position to short across the integrator output leads. This results in effectively resetting all the integrators to zero immediately before the beginning of each scanning cycle, so that the resultant reading at the end of each revolution of the tape belts 56 and 79 is representative only of the particular cycle and is not affected by previous readings.

For purposes of determining, in correlation with the making of record 150, the displacement of one of tapes 56 and 79 relative to the other in units of time there is also recorded on the record 150 a timing trace 170, which may conveniently be the integrated output of a multiplier 172 fed by the amplifiers 91 and 97. This integration is performed by the circuit 173, and the result is transmitted by the leads 174 to the recording voltmeter 175 which actuates the recording contactor 176 pressing against the surface of record 150. Referring briefly to Figure 6, it will be noted that the trace 87a, when multiplied by the trace 51a, which is a signal of the same frequency, will produce a maximum or positive product when the two traces are in phase and a minimum or negative product when they are out of phase. The trace 170 is, therefore, a periodic function of the same frequency as the timing trace 51a or the reference trace 87a, and thus the spacing between peaks is the same as in the timing traces, for example, 10 milliseconds. Consequently, this timing trace 170 provides a reference by which the displacement between the trace 86 and the seismometer traces 53, 54, and 55 can be established on an absolute time scale on the record 150.

As the reflection pattern trace 86 reaches a displacement where the reflections on it are in phase with the reflections recorded on the traces 53, 54, and 55, the respective maximum values of the integrals indicated by the peaks 178, 179, and 180 are recorded. The peak 180 corresponds to the integral of the product which is obtained with the traces in the exact relative position shown in Figure 6. That is, three signals of the trace 86 are all exactly in phase with the three reflections on trace 55 received from one subsurface interface, as 67, whereas they were in phase with the reflections on traces 53 and 54 at slightly earlier times indicated by the peaks 178 and 179. Thus, the time interval between the recording of peak 178 and the peak 180 can be taken as the moveout time between the signals from seismometers 26 and 28, due either to their separation along the spread 25 or to the dip of the interface 67 or both.

Figure 7:
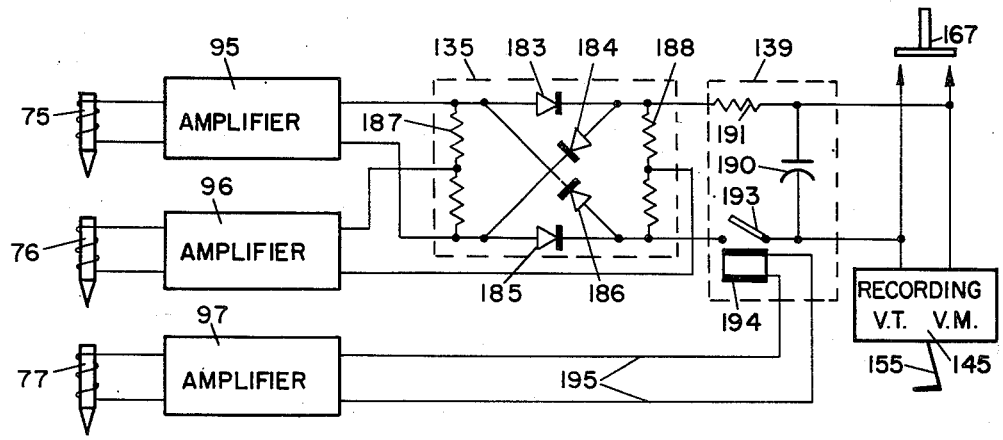
Figure 7 is a wiring diagram of a typical recording channel.

In Figure 7 is shown in somewhat more detail the interconnection of the circuits which produce trace 149. Thus, the pick-up head 75, connected to amplifier 95, and pick-up 76, connected to amplifier 96, feed the multiplier circuit 135 which is shown in detail. This multiplier circuit is in the form of double-balanced or ring-type modulator comprising the rectifying units 183, 184, 185, and 186 connected in series in a ring, with the same polarity around the ring, and with center-tapped input and output resistors 187 and 188, respectively. The signal from amplifier 95 is applied across the input resistor 187, while the signal from amplifier 96, corresponding to the reflection pattern trace 86, is applied at the center taps of the input and output resistors 187 and 188. This circuit produces across the output resistor 188 a voltage proportional to the instantaneous product of the two input voltages, which product voltage is applied to the integrating circuit 139 consisting of a condenser 190 and series resistance 191, the final voltage across the condenser 190 being applied to the recording vacuum-tube voltmeter 145 and recorded by the position of contactor arm 155.

The output of amplifier 97, which differs from zero only during the time interval between $T_1$ and $T_2$ (note Figure 6), is applied over the lead 195 to a relay 194 operating a normally open contact or switch 193 in series with the condenser 190. This results in switch 193 being closed only during the time interval from $T_1$ to $T_2$ so that condenser 190 is isolated at all times except during the time interval $T_1$ to $T_2$, during which interval it accumulates a charge depending upon the polarity and magnitude of the varying product voltage received from the multiplying circuit 135. Thus, the switch 193 prevents the resistance 188 from discharging condenser 190 during all portions of the cycle except within the interval $T_1$ to $T_2$. Consequently, regardless of the speed of rotation of shaft 103, the charge received by the condenser 190 is an indication of the total value of the integral during this time interval, which value is that recorded by the contactor 155 at the end of each scanning cycle. The closing of contacts 167 immediately after making the recorded indication of the position of contact arm 155 effectively discharges condenser 190 so that it is in a position to act as an integrator during the next scanning cycle. The fact that the switch 193 is open at all times except during the interval from $T_1$ to $T_2$ is immaterial since the product of the trace 86 and any of the traces by which it is multiplied is zero, regardless of the amplitude of the other traces, as long as the trace 86 itself is zero.

While it is perhaps not as convenient and simple in some respects as the electrical circuits just described, a wattmeter-type element may be utilized to perform the multiplying and integration steps. By applying the two electric currents to be multiplied, respectively to the moving and the fixed field coils of the wattmeter element, and assuming that the moving coil has an appreciable inertia to prevent its responding to high-frequency currents, then the resultant position of the moving coil is representative of the time average of the product of the two input functions, which is the type of response desired.

In order to determine at any time the exact relation between the various traces, either at the beginning or during the progress of the analysis, this may be done simply by closing the switch 99 and making a photographic or like visible record in conventional form with the recorder 100. It will be apparent that the same process of analysis may be applied, using any form of pattern signal trace different from that shown in Figure 6, in order to test the recorded signal traces 53, 54, and 55 for the presence of the assumed or pattern signal. When the form of the assumed signal is most nearly like the form of the actual signal present on these traces, then the value of the integral becomes a maximum, and the peak 180 reaches its greatest height.

Figure 8:
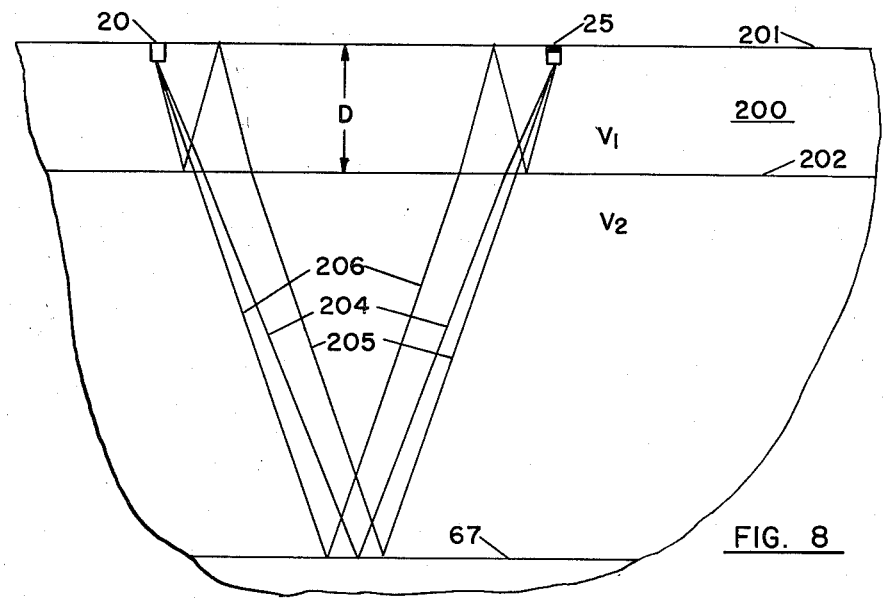
Figure 8 is a cross section of the earth illustrating certain wave paths occurring in the use of a modification of the invention.

In Figure 8 is shown an idealized cross-section of earth with a modification of my invention in testing position thereon. In certain areas of the country there is present a more or less homogeneous and fairly thick layer of earth medium 200 having an upper boundary 201 and a lower boundary 202 at which strong reflections of seismic waves occur. One example of this is the thick limestone layer at the surface of the Edwards Plateau in Southwest Texas. In such cases, it has been observed that the reflection from a subsurface interface 67 is no longer a simple wavelet such as the solid line 203 shown in Figure 9, for example, but is rather a wave train of substantial extent, such as is shown by the dashed line continuation in this figure. This wave form is apparently due to the reverberation of the seismic waves between the top and bottom of layer 200, the shaded areas being the added contribution of this reverberation effect.

In Figure 8 are shown some of the possible wave paths followed by seismic waves from a shot point 20 to a detector spread 25 when the reverberation effect is present.

Thus, a seismic wave from shot point 20 near upper boundary 201 may travel a direct path 204 from the shot point to the receiver 25; or it may be reflected from the interface 202 near the shot point back to the surface 201 and then to the detector 25 over a direct path 205, in which case it arrives at a time later than over the path 204 by approximately the time interval $$\frac{2D}{V_1}$$

where D is the thickness of layer 200 and $V_1$ the seismic velocity through the layer; alternatively, the seismic wave may travel by a direct path 206, then undergoing a reverberation at the detector end of the path by reflection from the interface 201 near the receiver back to interface 202 and thence to the detector 25 in which case there is a similar delay $$\frac{2D}{V_1}$$

Likewise, more than one reverberation may occur on either or both ends of the travel path, the successive delay times between peaks being a multiple of $$\frac{2D}{V_1}$$

In view of the foregoing discussion it is apparent that a reflection obtained from the interface 67 must be recognized, if it is present, by its character as a train of waves rather than as a single pulse. In accordance with my invention, advantage is taken of this fact by placing at the shot point 20 a plurality of charges, for example, from 2 to 5, which are then detonated in a fixed time sequence so that the energy of a subsequent shot traveling by a direct wave path 204 arrives at the detector spread 25 in phase with the reverberation energy of a former shot traveling along a path such as 205 or 206. By so doing, it is possible to take advantage of the energy in the reverberations to build up a wave train of considerably larger amplitude than can be built up by a single charge of the same weight of explosive, without proportionately increasing the noise background.

Figure 9:
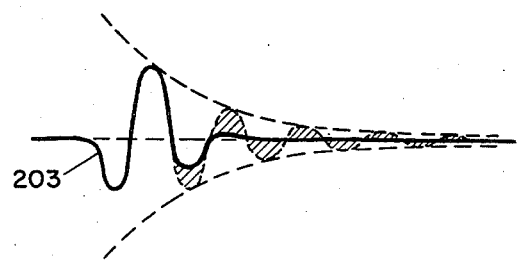
Figures 9 and 10 are diagrams illustrating wave forms employed in the modification of Figure 8.
Figure 10:
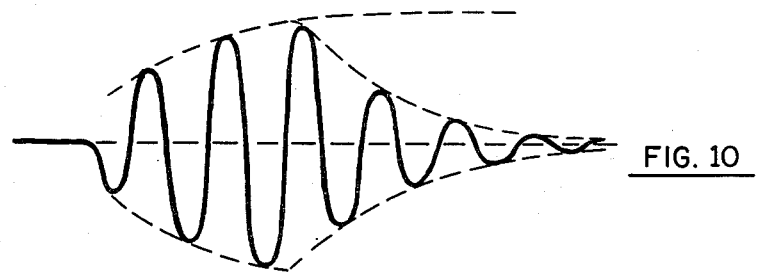

In Figure 10 is shown, for example, the wave train built up by the in-phase superposition of the energy of three charges, each capable of creating alone the wave train shown as Figure 9. As appears in Figure 10, the amplitude of the resultant wave train increases with each shot until the final shot is fired, and thereafter the amplitude drops off as in Figure 9. The time intervals between successive shots are preferably equal to each other and equal to the time $$\frac{2D}{V_1}$$

which is the transit time for energy from boundary 201 to boundary 202 and back again. It is sufficient in most cases to neglect the horizontal component of the wave travel-path, as the added travel time due to this is generally small compared to the travel time through the vertical thickness of the bed 200. In Figure 8, the horizontal distance between the shot point 20 and the detector 25 is exaggerated relative to the vertical depth to the interface 67 to show the different wave paths more clearly. In practice the travel paths 204, 205, and 206 are generally much more nearly parallel and vertical throughout their lengths.

Having made such a record with multiple shots at the shot point 20, the problem is then to locate the onset of each reflection wave train having the form shown in Figure 10, in the presence of noise and conflicting wave trains. While this may perhaps be done by using a narrow band-pass filter system tuned to the reverberation frequency, it is preferred to employ the automatic analysis system of Figure 4, using in this case as the pattern trace 86 a wave train of the form shown in Figure 10. By plotting the correlation function between the wave train of Figure 10 and the seismometer traces, while varying the time-phase relation of the pattern trace relative to the recorded traces throughout the entire recording period or selected portions of it, the points of maximum correlation can be readily interpreted in terms of reflection arrival times. Furthermore, the amplitude relations of the successive wave peaks shown in Figure 10 can serve, in addition to their frequency and the duration of the wave train, as criteria on the presence of a reflection, which should possess not only the periodicity imposed by the reverberating layer 200 but also relative peak amplitudes similar to those of the wave in Figure 10.

It should be noted that, if the shot point 20 is not close to boundary 201, but is located within the layer 200, then the reverberation pattern becomes more complex, in general being made up of two frequencies, each depending on the distance from the shot 20 to one of boundaries 201 or 202. For the shot position in the middle of layer 200, the situation again becomes less complex, the delay time between a pulse and its first reverberation from upper boundary 201 being $$\frac{D}{V}$$

instead of $$\frac{2D}{V}$$

In general, the reverberation peaks come at times which are multiples of $$\frac{D}{V}$$

after the direct pulse. Consequently, the preferred time spacing of successive shots is $$\frac{D}{V}$$

instead of $$\frac{2D}{V}$$

Figure 11:
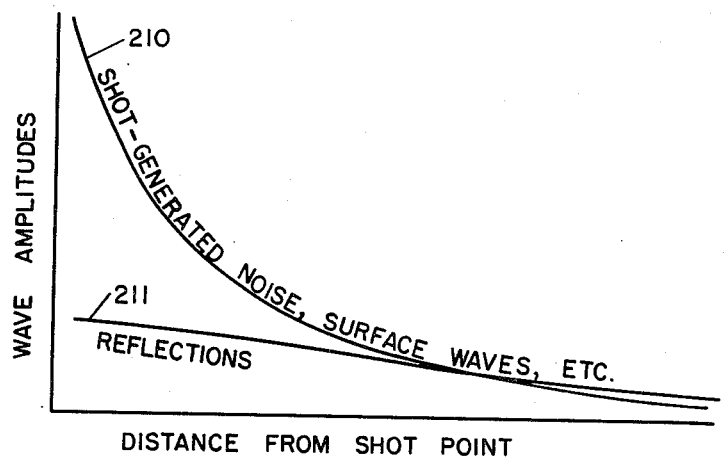
Figure 11 is a graph showing the relationship of certain wave amplitudes.
Figure 12:
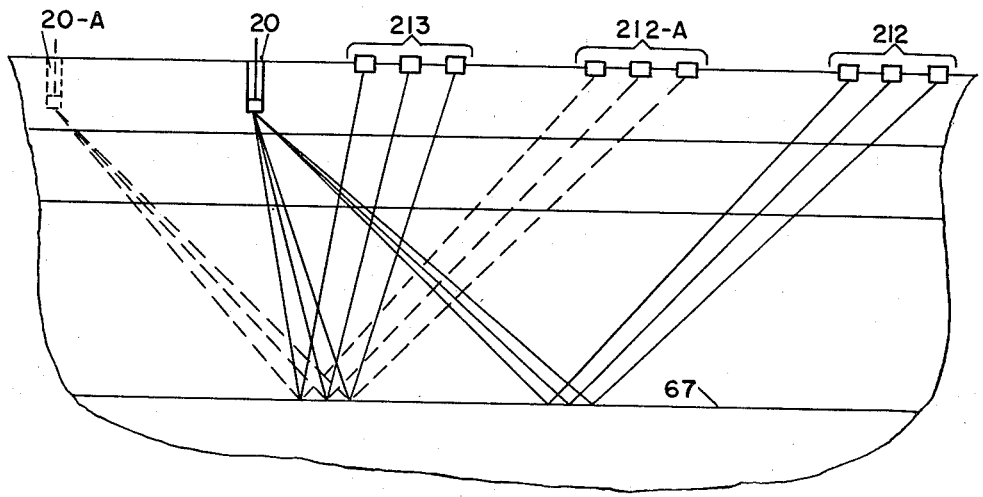
Figure 12 is a cross section of the earth showing a further embodiment of the invention adapting the information of Figure 11.

In Figure 11 is shown graphically another effect which has been noted in some areas of difficult seismic prospecting. As is shown by the curve 210, the amplitude of the shot-generated noise and surface waves at many locations has been observed to be exceedingly large near the shot point but to fall off quiet rapidly with distance in a horizontal direction away from the shot point. The reflections, on the other hand, while also strongest near the shot point, also decrease in amplitude with horizontal distance away from the shot point, but at a much slower rate, for example, as shown by the curve 211. Accordingly, there is a location, which can be easily visualized, where the reflections are still of substantial amplitude, whereas the interfering surface waves and shot-generated noise are of considerably reduced amplitude. Therefore, in accordance with my invention and as is shown in Figure 12, I am able to ascertain the best form of the reflection wave, particularly for the multiple-pulse initiation of the waves, by locating the seismometer spread 25 at a large distance from the shot point 20, such as at the location 212.

The difficulty, however, with using the information obtained at location 212 for accurately determining depth to the interface 67 is that the waves are known to travel through the subsurface beds at such large angles from the vertical that their total distance of travel and exact path followed cannot be accurately ascertained. On the other hand, when the spread 25 is placed close in to the shot point 20 at the location 213, where the travel paths are more nearly perpendicular to the bed interfaces, the surface waves and other noise are of such large amplitude as to override completely and mask the reflections. Consequently, in accordance with my invention I can utilize portions or all of the record made at the location 212 as the comparison record or reflection pattern form to be compared for correlation with the record made at location 213 as the primary depth data. The resultant indications obtained from the correlation function traces of a record 150 are then utilized for identifying the reflection waves in the record made at location 213 and determining accurate travel times. By thus knowing the proper wave form for the reflections and making use of this wave form or reflection pattern in the cross-correlation analysis of the noise-containing traces, a much improved signal-to-noise ratio is obtained.

In areas where the reflection character may change rapidly with lateral spread position, it will often be desirable to offset both the shot point 20 and the spread 25 so as to utilize the same subsurface reflection area for both the timing and the pattern records. Thus, by placing the shot at location 20-A and the spread at location 212-A as shown in Figure 12 the required spread offset distance for favorable signal-to-noise ratio is attained without varying the subsurface reflection points.

While I have thus described my invention in terms of the foregoing specific details and embodiments thereof, it is to be understood that these are by way of illustration only and that the scope of the invention is properly to be ascertained by reference to the appended claims.

I claim:

1. The method of seismic surveying which comprises applying to the earth at a given location a plurality of seismic wave-creating impulses separated in time by intervals of arbitrary length at least as great as the period of the predominant seismic waves it is desired to detect, receiving a plurality of points spaced from said location the resultant seismic waves after travel through the subsurface, recording the waves received at said points as a plurality of phonographically reproducible traces, reproducing said traces as a plurality of electric waves, multiplying each of said electric waves by a pattern wave having a form which is that of a substantially noise-free seismic signal to produce a plurality of product waves, forming the integral of each of said product waves over a period of time at least as long as the duration of said seismic wave-creating impulses, and recording the varying values of the resulting integrals as functions of the relative time phase between said pattern wave and said electric waves.

2. The method of seismic surveying which comprises applying to the earth at a given location from two to five seismic wave-creating impulses spaced in time by arbitrary intervals of a length between 50 and 200 milliseconds, receiving at a plurality of points spaced from said location the resultant seismic waves after travel through the subsurface, recording said waves as a plurality of phonographically reproducible traces, reproducing said traces as a plurality of electric waves, multiplying each of said electric waves by a pattern wave having a form substantially that of noise-free seismic signals spaced by said arbitrary intervals to produce a plurality of product waves, forming the integral of each of said product waves over a period of time at last equal to the duration of said impulses, and recording the value of said integral as a function of the time phase between said electric waves and said pattern wave, said time phase being varied substantially continuously and completely throughout the duration of said electric waves.

3. The method of seismic surveying which comprises detonating in succession at least three explosive charges in different but adjacent shot locations with unequal time intervals of between 50 and 200 milliseconds between successive charges to apply seismic wave-creating impulses to the earth, receiving the resultant seismic waves after travel through the subsurface at a location spaced from said shot locations, multiplying the received waves by a pattern wave having the form of relatively noise-free seismic waves separated in time by said unequal time intervals, integrating the multiplied waves over a time period at least as long as the duration of the events on said pattern wave, and recording the value of the resultant integral.

4. The method of analyzing seismic-wave records on which each seismic event it is desired to observe is repeated at least once after a time interval of arbitrary length on each one of multiple traces which comprises multiplying each of said traces by a pattern trace containing relatively noise-free seismic events spaced in time by said interval to form a plurality of product functions, integrating each of said product functions over a time period at least equal in duration to all of the events on said pattern trace, and recording the varying values of the resulting integrals as functions of the relative time phase between said pattern trace and said multiple traces, said time phase being varied substantially continuously throughout at least a portion of said multiple traces.

5. The method of seismic surveying in areas having a layer which produces reverberations at a frequency close to seismic frequencies it is desired to observe which comprises applying to the earth at a given location a plurality of impulses separated in time by intervals equal to the period of said reverberation, receiving at a plurality of points spaced from said location the resultant seismic waves after travel through the subsurface, and analyzing said waves for the presence of and the times of initiation of trains of waves having the frequency of said reverberation.

6. The method of seismic surveying in areas having a layer producing reverberations at a frequency close to seismic frequencies it is desired to observe, which layer is of a thickness D and possesses a seismic wave-propagation velocity V, which method comprises applying to the earth at a given location a plurality of seismic wave-creating impulses separated by equal time intervals each of a length equal to $$\frac{2D}{V}$$

receiving at a plurality of points spaced from said location the resultant seismic waves after travel through the subsurface, recording said waves as a plurality of parallel traves on a record, and analyzing said record for the presence and initiation times of wave trains in which the waves have a period equal to $$\frac{2D}{V}$$

7. The method of seismic surveying which comprises applying to the earth a plurality of seismic wave-creating impulses separated in time by intervals at least as long as the period of a seismic wave to be detected, receiving the resultant seismic waves after reflection by a given subsurface interface at two different spread-offset distances from the location of application of impulses, for which distances the signal-to-noise ratios are substantially different due to the more rapid attenuation of noise generated by said impulses with distance from said location than the attenuation of the desired seismic waves, multiplying the waves received at the smaller of said two distances by the waves received at the larger of said distances to produce a product function, forming the time integral of said product function over a period of time at least co-extensive with all the waves received at the larger distance after reflection by said interface, and varying the time phase between the waves being multiplied to obtain a maximum value of said integral.

8. The method of claim 7 in which both the location of impulse application and the point of reception of seismic waves are shifted away from each other to provide the larger of said two spread-offset distances, while maintaining the reflection points on said subsurface interface substantially constant.

9. The method of seismic surveying which comprises applying to the earth at a given location a plurality of seismic wave-creating impulses spaced in time by arbitrary intervals of a length at least equal to the period of a seismic wave to be detected, receiving the resultant seismic waves after reflection by a given subsurface interface at a first detector spread spaced at a small offset distance from said location, receiving said waves after reflection by said interface at a second detector spread spaced from said location by a substantially greater offset distance than said first spread, recording the waves received at each of said first and second spreads, multiplying the waves received at said first spread by the waves received at said second spread to form a product function, forming the time integral of said product function over an interval of time at least coextensive with the reflections of all of said impulses by said interface, and recording the varying value of said integral as a function of the relative time phase between the waves received at said first spread and those received at said second spread.

10. Apparatus for seismic surveying comprising means for applying in succession to the earth a plurality of seismic wave-creating impulses, means for controlling said impulse-applying means to space said impulses by arbitrary time intervals at least as great as the period of a seismic wave to be detected, a plurality of seismic-wave detectors spaced from said impulse-applying means for receiving the resultant seismic waves after travel through the subsurface, a recorder coupled to and actuated by said detectors for making a phonographically reproducible record of said waves, means for reproducing said waves from said record in the form of electric waves, a source of an electric pattern wave having a form corresponding to substantially noise-free seismic signals with the arbitrary spacing in time of said impulses, a multiplying circuit coupled to said reproducing means and to said pattern-wave source for producing a product function proportional to the product of said electric and said pattern waves, an integrating circuit connected to said multiplying circuit for producing an integral of said product function over a time period at least equal to the duration of the events on said pattern wave, means for varying the time phase between said electric and said pattern waves, and means connected to said integrating circuit for recording the varying value of said integral as a function of said time phase.

11. Apparatus for analyzing a phonographically reproducible multiple-trace seismic-wave record on which each event it is desired to observe is repeated at least once after a time interval of arbitrary length at least equal to the period of the seismic waves it is desired to detect comprising phonographic reproducing means actuated by the wave traces on said record to produce corresponding electric waves, a source of an electric pattern wave having relatively noise-free seismic events with the same arbitrary spacing as on said seismic-wave record, a multiplying circuit connected to said pattern-wave source and to said phonographic reproducing means for producing an output product function proportional to the instantaneous products of said pattern and each of said electric waves, an integrating circuit coupled to the output of said multiplying circuit for producing the time integral of said product function over an interval at least coextensive with the pattern on said electric pattern wave, means for recording the value of said integral as a function of the time phase between said pattern and said electric waves, and means for varying said time phase.

12. Apparatus for analyzing a phonographically reproducible seismic-wave record on which each event it is desired to observe is repeated at least once after a time interval of arbitrary length at least equal to the period of a predominant seismic wave it is desired to detect comprising means for cyclically reproducing said seismic waves from said record in the form of electric waves, a source of an electric pattern wave of a form corresponding to a relatively noise-free seismic event repeated with the same time interval as the recorded seismic events, a multiplying circuit connected to said cyclic reproducing means and to said pattern-wave source for producing a product function which is proportional to the instantaneous product of said electric and said pattern waves, an integrating circuit connected to said multiplying circuit for producing the time integral of said product function over a period of time at least coextensive with the pattern of said pattern wave, means for recording the value of said integral, and means for changing the time phase between said pattern and said electric waves with each cycle of reproduction of said seismic waves, the foregoing steps being repeated for each value of said time phase whereby the recorded values of said integral vary as a function of said time phase.

13. The method of seismic surveying in areas having a layer which produces reverberations at a frequency close to seismic frequencies it is desired to observe which comprises applying to the earth at a given location a plurality of seismic wave-creating impulses with a spacing pattern in time which places the direct wave from each subsequent impulse in phase with a reverberation wave from a previous impulse, receiving at a plurality of points spaced from said location the resultant seismic waves after travel through the subsurface, recording the received waves as a plurality of parallel traces on a record, multiplying each of said traces by a pattern wave train having waves of the reverberation frequency to provide a plurality of product functions, integrating each of said product functions over a time period at least as long as the duration of said pattern wave train, and recording the value of each of the resulting integrals as a function of the time phase between said pattern wave train and said multiple traces.

14. The method of seismic surveying which comprises detonating in succession at least three explosive charges in different but adjacent shot locations with unequal time intervals of between 50 and 200 milliseconds between successive charge detonations to apply seismic wave-creating impulses to the earth, receiving at a plurality of reception points spaced from said location the resultant seismic waves after travel through the earth, recording the received seismic waves as a plurality of parallel traces on a record, and analyzing said record for events having both the usual characteristics of desired seismic waves and also the imposed spacing in time of said impulses at said unequal intervals.

15. The method of seismic surveying which comprises detonating in succession at least three explosive charges in different but adjacent shot locations with unequal time intervals of between 50 and 200 milliseconds between successive charge detonations to apply seismic wave-creating impulses to the earth, said intervals being of a length greater than the period of the lowest frequency seismic waves it is desired to detect, receiving at a plurality of reception points spaced from said location the resultant seismic waves after travel through the earth, recording the received seismic waves as a plurality of parallel traces on a record, passing said record through a reproducing device adapted at each instant to scan a time interval of each of said record traces at least as long as the duration of the applying of said impulses, said device being responsive both to the usual characteristics of desired seismic waves and to the occurrence of said waves at the imposed unequal time-spacing intervals within the scanned record-trace interval, and producing a visual record of the output of said reproducing device.

References Cited in the file of this patent

UNITED STATES PATENTS

| | | |
|---|---|---|
| 2,320,248 | Shimek | May 25, 1943 |
| 2,377,903 | Rieber | June 12, 1945 |
| 2,394,990 | Eisler et al. | Feb. 19, 1946 |
| 2,427,421 | Rieber | Sept. 16, 1947 |
| 2,479,518 | Scherbatskoy | Aug. 16, 1949 |
| 2,521,130 | Scherbatskoy | Sept. 5, 1950 |
| 2,578,133 | Hawkins | Dec. 11, 1951 |
| 2,628,689 | Rieber | Feb. 17, 1953 |